United States Patent
Young

(10) Patent No.: US 6,615,914 B1
(45) Date of Patent: Sep. 9, 2003

(54) PROGRAMMABLE, HEATABLE, COOLABLE REACTION VESSEL UTILIZING PHASE CHANGE REFRIGERATION

(76) Inventor: Li Young, 553 Stony Brook Dr., Bridgewater, NJ (US) 08807

( * ) Notice: Subject to any disclaimer, the term of this patent is extended or adjusted under 35 U.S.C. 154(b) by 0 days.

(21) Appl. No.: 09/324,825

(22) Filed: Jun. 2, 1999

(51) Int. Cl.[7] ............................................... F25B 29/00
(52) U.S. Cl. ..................... 165/267; 165/48.1; 165/61; 165/263; 165/64; 62/51.1; 435/286.5; 435/286.6; 435/286.1; 422/63; 422/108; 422/109
(58) Field of Search ...................... 165/61, 48.1, 263, 165/30, 64, 267; 62/51.1; 435/290, 286.1, 286.5, 286.6; 422/63, 108, 109

(56) References Cited

U.S. PATENT DOCUMENTS

| | | | | |
|---|---|---|---|---|
| 2,472,362 A | * | 6/1949 | Barnebey et al. ............. | 165/64 |
| 2,739,221 A | * | 3/1956 | Morey | |
| 2,894,881 A | | 7/1959 | Wolfston, Jr. et al. | |
| 3,143,167 A | * | 8/1964 | Vieth ........................... | 165/64 |
| 3,239,432 A | | 3/1966 | Rhoded et al. | |
| 3,473,387 A | | 10/1969 | Meriam | |
| 3,479,252 A | | 11/1969 | Holm et al. | |
| 4,030,314 A | * | 6/1977 | Strehler ..................... | 62/514 R |
| 4,117,881 A | * | 10/1978 | Williams et al. .............. | 165/30 |
| 4,276,264 A | | 6/1981 | Redikultsev et al. ........ | 422/307 |
| 4,346,754 A | * | 8/1982 | Imig et al. .................... | 62/51.1 |
| 4,480,682 A | * | 11/1984 | Kaneta et al. ............... | 165/263 |
| 4,489,569 A | * | 12/1984 | Sitte ............................ | 62/51.1 |
| 4,502,531 A | * | 3/1985 | Petersen ..................... | 165/263 |
| 4,548,259 A | * | 10/1985 | Tezuka et al. ............... | 165/263 |
| 4,563,883 A | * | 1/1986 | Sitte ............................ | 62/51.1 |
| 4,578,963 A | * | 4/1986 | Sitte ............................ | 62/51.1 |
| 4,667,730 A | | 5/1987 | Zemp .......................... | 165/14 |
| 4,846,257 A | * | 7/1989 | Wallace ....................... | 165/58 |
| 5,123,477 A | * | 6/1992 | Tyler ........................... | 165/48.1 |
| 5,139,079 A | * | 8/1992 | Becraft et al. ............... | 165/61 |
| 5,154,067 A | | 10/1992 | Tomizawa .................... | 62/480 |
| 5,176,202 A | * | 1/1993 | Richard ....................... | 165/48.1 |
| 5,337,806 A | | 8/1994 | Trunner ....................... | 165/47 |
| 5,489,532 A | * | 2/1996 | Charm et al. ................ | 165/48.1 |

FOREIGN PATENT DOCUMENTS

| | | | | |
|---|---|---|---|---|
| EP | 0400965 A2 | * | 7/1991 | |
| JP | 0031890 | * | 3/1979 | ................... 165/61 |
| JP | 61-275232 | * | 12/1986 | ................... 165/58 |

* cited by examiner

Primary Examiner—John K. Ford
(74) Attorney, Agent, or Firm—Kenneth P. Glynn, Esq.

(57) ABSTRACT

A reaction vessel system includes a reaction vessel, a cooling unit functionally connected to the vessel to impart controlled cooling thereto; a heating unit functionally connected to the vessel to impart controlled heating thereto; and control means connected to the cooling unit and the heating unit for programmable automatic control of the cooling unit to control at least one of on/off flow and rate of flow, and to control at least one of on/off heating and rate of heating, including a programmable device. The cooling unit includes a cooling element in proximity to the vessel with at least one inlet port for injection of a phase change coolant, a heat absorbent area and at least one outlet port for removal of the phase change coolant. This is an injector for injecting the coolant in liquid form via the inlet port to the cooling element. In preferred embodiments, the control means includes software, and the system includes an injection physical control device, for cyclical on/off control thereof to establish a predetermined temperature sequence involving a plurality of diverse, programmable temperature levels. The phase change coolant used in the present invention is an environmentally inert material which absorbs heat upon vaporization and has a boiling point below room temperature at atmospheric pressure, and may be selected from the group consisting of inert gases, carbon dioxide and nitrogen.

14 Claims, 4 Drawing Sheets

PROGRAMMABLE, HEATABLE, COOLABLE REACTION VESSEL UTILIZING PHASE CHANGE REFRIGERATION

BACKGROUND OF THE INVENTION

1. Field of the Invention

The present invention is directed to reaction vessels with heating and cooling capabilities, and more particularly to such vessels having cooling units which uniquely rely upon phase change coolant injection. Preferred embodiments also include preprogramnable systems.

2. Information Disclosure Statement

The following patents are representative of prior art related to various types of heated/cooled reaction vessels:

U.S. Pat. No. 2,894,881 to Clinton M. Wolston, Jr. et al. describes a laboratory distillation testing apparatus having a condenser tank, a flask, a flask supporting means, a heating means, a condenser tube passing through the said tank, and a light diffusing panel, the improvements which comprise a recess in said condenser tank, a shield means disposed within said recess, adjustable shelf means carried by said shield means for supporting said flask, conduit means below said tank, and solenoid valve means on said conduit means, the discharge end of said conduit means projecting forwardly of the rear wall of said recess below said condenser tube inlet and arranged to discharge forwardly and downwardly towards said shelf means.

U.S. Pat. No. 3,239,432 to Joseph C. Rhodes et al. describes an apparatus for controlling the operation of a first distillation column and for determining the distillation properties of a product sample from said first column which apparatus comprises: means for withdrawing a product sample containing a mixture of liquids having different boiling points from said first column; a test column member; a plurality of liquid-retaining trays spaced apart vertically within said test column; a liquid sample container positioned below said test column and in flow communication with the bottom-most portion of said test column; means for receiving said withdrawn product sample and introducing a known amount of said product sample into said container; means for vaporizing liquid sample introduced into said container; vapor riser means for passing vapors from the lower portion of said test column upwardly through said test column to intimately contact liquid retained on said trays; condensing means communicating with the upper end of said test column to condense all the vapors rising from the uppermost of said trays; means for returning the resulting condensate to the upper-most of said trays; means for maintaining the test column pressure at a substantially constant pressure during a run; means for maintaining a pre-selected level of liquid on said trays; temperature sensing means to sense the temperatures and produce a temperature signal indicative thereof of equilibrium vapors above the trays in said test column; means for receiving said temperature signal and correlating the sensed temperatures with the distillation properties of a known product sample of approximately the same composition as said sample being run and produced an output signal relative to said correlation; and means for receiving said output signal and adjusting the control parameters of the first column in accordance with said output signal.

U.S. Pat. No. 3,473,387 to Charles Meriam describes an inclined-manometer-type of fluid characteristic measuring instrument which is responsive to pressure sensing for directly reading volume, weight or velocity of flow, or differential pressure across a flow measuring orifice, nozzle, venturi or laminar flow element or for directly reading static head, velocity head or total head fluid pressure. Adjustments are provided for correcting the instrument reading measurements for variations in fluid measurement conditions, including temperature of, density of, viscosity of, barometric pressure on, humidity of, mixture of fluids in, etc. of the fluid being measured; temperature, etc. of the manometer liquid; etc.

U.S. Pat. No. 3,479,252 to Kurt Anders Holm et al. describes an invention which is concerned with an apparatus for degreasing articles by means of a boiling solvent or vapour originating therefrom. The apparatus has double walls, and cooling means which are provided between said double walls. The cooling means comprise water spraying means, and means for passing ventilation air through the space defined by said double walls. Consequently, the venilation air has the double function of withdrawing solvent vapour and cooling the wall of the apparatus.

U.S. Pat. No. 4,276,264 to Jury V. Redikultsev et al. describes a device for sterilizing water-containing liquid media by steam which comprises a sterilizing vessel with inlet and outlet connections for processed liquid media. A heater is provided in the lower portion of the vessel, while a condenser is arranged in the upper portion thereof The vessel also houses a coaxially mounted steam-transfer unit representing gas-lift tube with a diffuser disposed over the heater.

U.S. Pat. No. 4,667,730 to Georg Zemp describes a temperature regulating apparatus for a laboratory reaction vessel arrangement, which comprises a reaction vessel and a thermal chamber for a fluid heat exchange medium which at least partially surrounds the reaction vessel. A jacketing vessel is provided with at least one inlet aperture for said fluid heat exchange medium and at least partially surrounds the thermal chamber. The at least one inlet aperture is arranged to extend through the jacketing vessel and into the thermal chamber, and a nozzle is arranged in a region of the at least one inlet aperture. This nozzle has an outlet orifice and is arranged in the region of the at least one inlet aperture such that the fluid heat exchange medium flows through the nozzle and out of the outlet orifice and such that the fluid heat exchange medium flowing out of the outlet orifice subsequently flows into said thermal chamber.

U.S. Pat. No. 5,154,067 to Takeshi Tomizawa describes a portable cooler for cooling an article by utilizing the endothermic and exothermic phenomenon pertaining to a chemical reaction which is disclosed, in which an adsorbent and a working medium are sealed in a reaction chamber defined between an inner wall and an outer wall, a working medium retaining member which is disposed on the inner wall inside the reaction chamber for holding therein the working medium, the working medium retaining member being spaced from the adsorbent disposed on the outer wall, and a heater is held in contact with the adsorbent for regenerating the same, at least a part of said outer wall constituting a heat radiating portion.

U.S. Pat. No. 5,337,806 to Josef Trunner describes a bath in which the supply reservoir is arranged for the liquid, in which the reaction flask has to be heated or cooled can be immersed. The heating or cooling device is arranged on the bottom of the supply reservoir. The liquid is delivered with an immersion pump through a feed pipe and an opening in the bottom of the bath The level of the liquid in the bath can be adjusted with the aid of a slider. The liquid flows back into the supply reservoir over an overflow. When the pump is switched off, the liquid in the bath flows independently back into the supply reservoir.

Notwithstanding the prior art, the present invention is neither taught nor rendered obvious thereby.

SUMMARY OF THE INVENTION

A reaction vessel system which includes a reaction vessel, a cooling unit functionally connected to the vessel to impart controlled cooling thereto; a heating unit functionally connected to the vessel to impart controlled heating thereto; and, control means connected to the cooling unit and the heating unit for programmable automatic control of the cooling unit to control at least one of on/off flow and rate of flow, and to control at least one of on/off heating and rate of heating, including a programmable device. While single cooling units, heating units, control means, etc., are described above and below in the singular, it should be understood that plural components, such as two or more cooling and/or heating units may be included without exceeding the scope of the present invention.

The cooling unit includes a cooling element in proximity to the vessel with at least one inlet port for injection of a phase change coolant, a heat absorbent area and at least one outlet port for removal of the phase change coolant; and injection means for injecting the phase change coolant in liquid form via the inlet port to the cooling element. In preferred embodiments, the control means includes software, and the system includes an injection means physical control device, for cyclical on/off control thereof to establish a predetermined temperature sequence involving a plurality of diverse, programmable temperature levels. The phase change coolant used in the present invention is an environmentally inert material which absorbs heat upon vaporization and has a boiling point below room temperature (e.g., below 24° C.) at atmospheric pressure, and may be selected from the group consisting of inert gases, carbon dioxide and nitrogen. Preferably, there is a remote reservoir which contains a phase change coolant in a liquid state under pressure. The system also includes at least one and preferably two temperature sensors connected to the vessel with feedback to the microprocessor for automatic temperature control adjustments.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
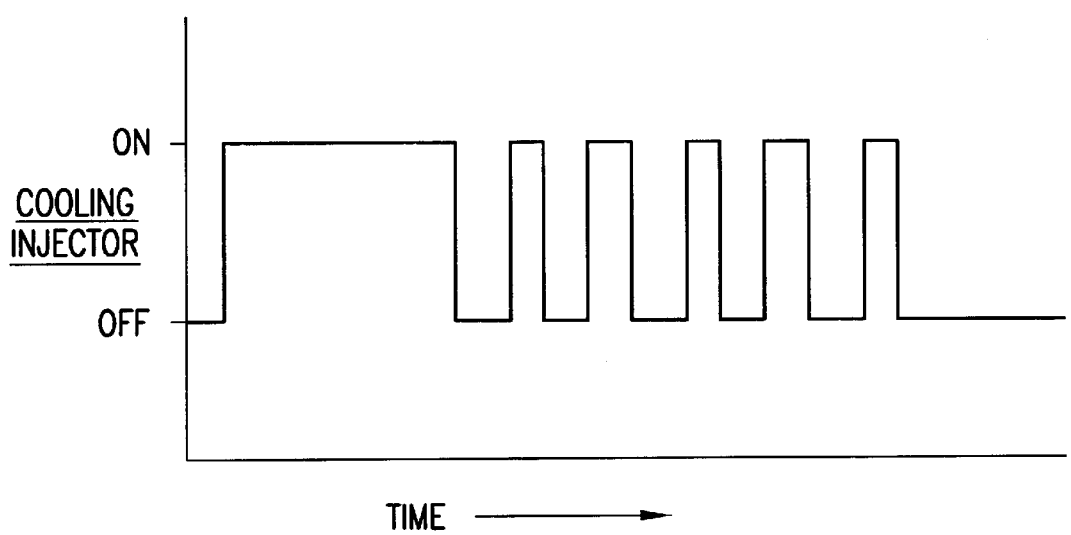
FIG. 1 is a graphical representation of the time sequence of cooling injector on-off cycling to accomplish the cooling temperature-time sequence shown in FIG. 2.

The present invention relates to reaction vessel systems that include programmable temperature/time sequences utilizing a microprocessor, a heating unit and a cooling unit. With this system various reaction requirements are automatically achieved, such as heating/cooling, cooling/heating sequences, refluxing, condensing, distilling and other steps necessary to achieve desired reaction conditions. The present invention system cooling unit uniquely relies upon phase change coolants where the endothermal heat of evaporation is absorbed from the reaction vessel when the phase change coolant is injected into the heat absorbing area with a programmable device, e.g. a computer, controlled injector. Environmentally inert phase change coolants are utilized and evaporated and dissipated to the atmosphere in gaseous form.

The reaction vessel utilized in the present invention may be any form of reaction vessel capable of transmitting heat therethrough to add or remove heat during a reaction process. Thus, the vessel may be glass, ceramic, cement, metal or other material, and may be opened or closed and at atmospheric pressure, fixed pressurized or variably pressured. It will have connected thereto (inside, outside, both or embedded) at least one temperature sensor, e.g. a thermocouple, to sense temperature. It preferably has at least two temperature sensors, for example, one at an upper portion of said vessel and one at a lower portion thereof The temperature sensors are connected to the control means, which has a programmable device, e.g., a computer, a microprocessor or other known devices as its central component.

The heating unit is one which may be automatically controlled, either by off/on sequencing or amount of heating (rate) or both. The heating unit may be conductive, convective, radiant, directly or indirectly, e.g. by heat exchanger or combination of heating mechanisms but is typically a steam heating element or an electric heating element type unit, with electrical convection to the microprocessor.

The heating unit may be a flat plate, a nest for the reaction vessel, an annular unit to encompass the reaction vessel, a wrap, a coil or any shape otherwise functionally connected to the vessel, i.e. connected directly or indirectly, permanently or temporarily thereto to impart heat to at least a portion of the vessel, e.g., at its lower portion.

The heating unit and cooling unit may be in close proximity to one another or spaced apart substantially depending upon the actual needs for the reactions of the reaction vessel.

The cooling unit of the present invention, like its heating unit counterpart, may take on any physical shape to accommodate the heat transfer (removal for cooling) relative to the reaction vessel. Critically, the cooling unit of the present invention includes a cooling element with an inlet port, a heat absorbing area and an outlet port or a plurality of one or more of these components. It also includes injection means at the inlet port for controlled injection of phase change coolant. While the present invention system may be manufactured and sold in various configurations without a phase change coolant supply, in actual use a phase change coolant supply is essential, e.g. by attachment of one or more pressurized inert liquid tanks or with a generator, or a compressor or other coolant creating, compressing or storing means.

The cooling element may be a coiled tubing or a molded, machined or an otherwise-formed open area within the cooling unit to permit injection of phase change coolant and is preferably adjacent to the reaction vessel itself. In other words, the open area of the cooling element is enclosed, e.g. with materials of construction which preferably include insulative characteristics. The phase change coolant is injected into the heat absorbing area at the inlet port and evaporates under normal pressure to its gaseous state and exhausts as gases through the outlet port. It is the endothermic heat of evaporation to the phase change coolant that absorbs heat from the vessel to effect cooling.

The phase change coolant may be any material which evaporates below room temperature, e.g. preferably below 24° C., and most preferably, below 0° C. Such materials are liquid under pressure and may be stored as such in storage reservoirs, e.g. tanks, for subsequent use or otherwise provided as described above. These coolants go through at least one phase change to effect a net heat absorbing transition, are environmentally inert, i.e. harmless to the environment when dissipated, and include such phase change coolants as are presently and/or will become commercially available. They include, but are not limited to, the elements known as inert gases, carbon dioxide, nitrogen, etc. The cooling mechanism of the current invention is based on the heat exchange during the phase change of coolant material and physical condition of the nozzle. A precise heat exchange control can be readily achieved by an appropriate selection and adjustment between either liquid to gas or a sequential phase change of liquid to solid then solid to gas. Commonly used coolants are pressurized liquid carbon dioxide, or pressurized liquid argon, or pressurized liquid nitrogen. Pressurized liquid carbon dioxide is preferred because it can be easily used to accommodate the critical point, which is very close to the room temperature at atmospheric pressure.

The injection means will typically include an injection nozzle, such as a stainless steel nozzle, a valving mechanism and a supply line, with the valving mechanism directly upstream from the injection nozzle. (In cases where small diameter tubing or inlet means is used, then such tubing or inlet means may also act as the nozzle itself, without added hardware.) The valving mechanism may be a flap or shutter valve or other on/off valve, or it may be a controlled opening (flow rate controlling valve) such as a stem valve or gate valve. The on/off valve mechanisms may be opened and closed by solenoids or switches or other known devices, and the flow controlling valves may be opened and closed by servo-drivers or other rotating or lifting devices. In a more complicated system, both types of valves, i.e. on/off and flow rate controlling valves may be used to offer both types of controls in the system.

The control means is any programmable device, such as manual switches, dials, buttons, levers, etc., with sensors for feedback, a computer or microprocessor with appropriate software or sequence input, external inputs and wiring to the cooling unit, to the heating unit and preferably, to the reaction vessel. More specifically, the programmable device may have output information available to a user, e.g. a microprocessor may have a display which includes a readout and programming inputs. For example, it could have a plurality of buttons, input means, selection means, switches, keypads, etc., with choices including "SEQUENCE NUMBER", "TEMPERATURE" and "TIME" with a numerical keyboard, and the microprocessor itself will divide when to use the heating unit and when to use the cooling unit to achieve the programmed temperatures for the specified times. The "TIME" inputs could be elapsed time needs or actual clock start and end times. In a more preferred embodiment, additional buttons, controls, inputs, icons, selections, etc. could include "HEATING UNIT" and "COOLING UNIT" selections so that both units could operate simultaneously or separately or both, as the user may desire other control inputs/outputs should now be evident to the artisan. In yet another embodiment, a user may be offered the opportunity to select proportional controls for flow, tolerances from a predetermined set of choices and other parameters, as a designer may offer to end users. Also, the programmable device may have time delay input capabilities before start-up is initiated or even offer unlimited off sequences between heating and/or cooling sequences for inputted periods of time. Other programming possibilities should now be apparent to the artisan without exceeding the scope of the present invention.

The total configuration of the system may be portable or somewhat permanent depending upon the size of the reaction vessel and the particular needs. Further, while the drawings described below are merely diagrammatic, actual embodiments would have appropriate support structures and in preferred embodiments, the reaction vessel itself may be movable from the remainder of the system, for reaction product removal, cleaning, etc. Additionally, while the drawings illustrate the system simplistically, it should be understood that spatial relationships are not limited to those shown. For example, in distillations and condensing, a reaction vessel may have a side arm or condensing tube and the cooling unit may be connected thereto rather than directly above the heating unit, without exceeding the scope of the present invention.

Figure 2:
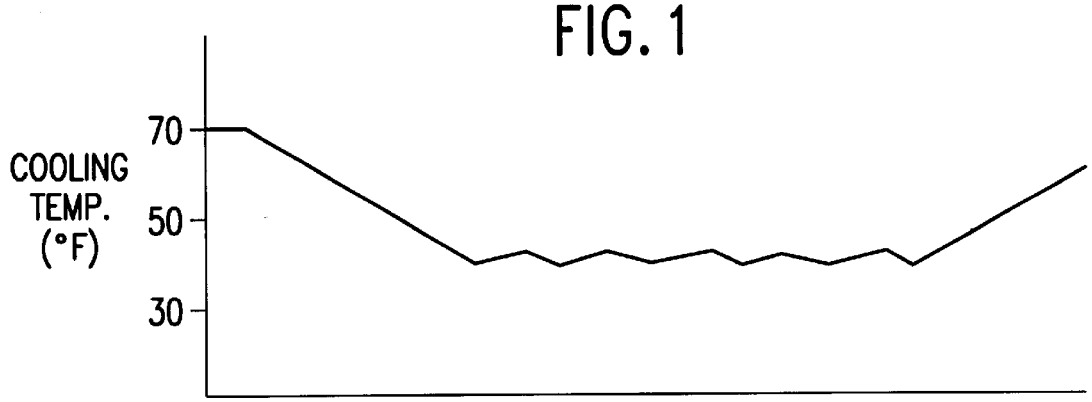

Referring now to FIGS. 1 and 2, there is shown a typical cooling temperature versus time sequence to be controlled within the reaction vessel by the system which is shown in FIG. 2. The cooling injector on-off time cycling, controlling injection of coolant into the system cooling unit, implemented by the system controller to accomplish this temperature-time cycle is shown in FIG. 1. In addition, FIG. 3 shows the time cycling of the percent injection cooling controlled by the injector, which is the modulation of the rate of injection of coolant into the reaction vessel cooling unit, implemented by the controller in combination with the cooling injector on-off cycling of FIG. 1, to accomplish the temperature-time sequence in the reaction vessel of FIG. 2.

Figure 3:
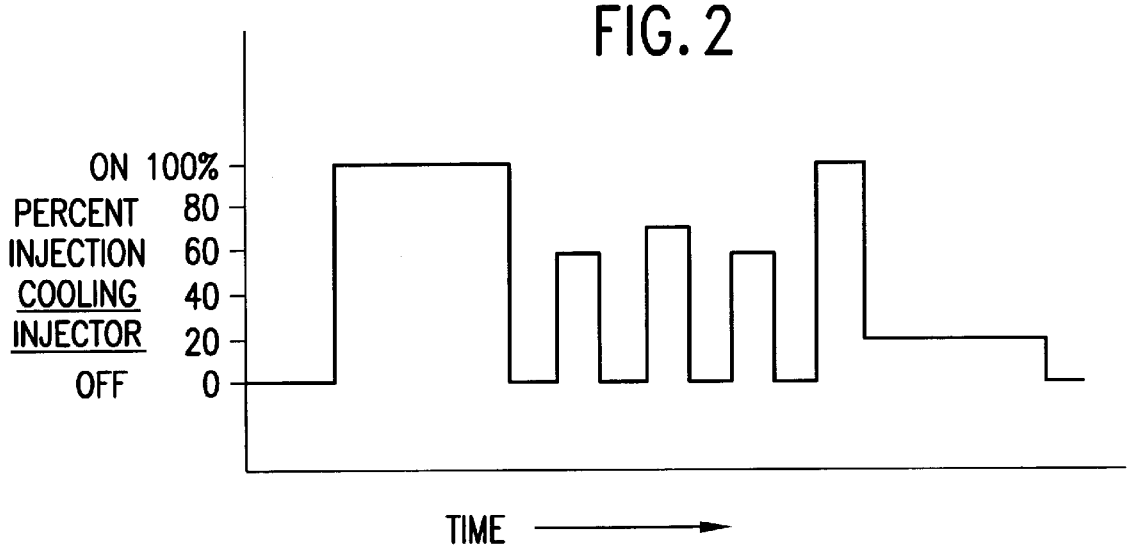
FIG. 3 shows the variation in percent injection cooling time sequence of the cooling injector used in conjunction with the cooling injector on-off sequence shown in FIG. 1 to accomplish the cooling temperature-time sequence of FIG. 2.

While the foregoing discussion pertaining to FIGS. 1, 2 and 3 above are specifically directed to cooling units, similar illustrations, discussions and control techniques could also be applied to heating units of the present invention.

Figure 4:
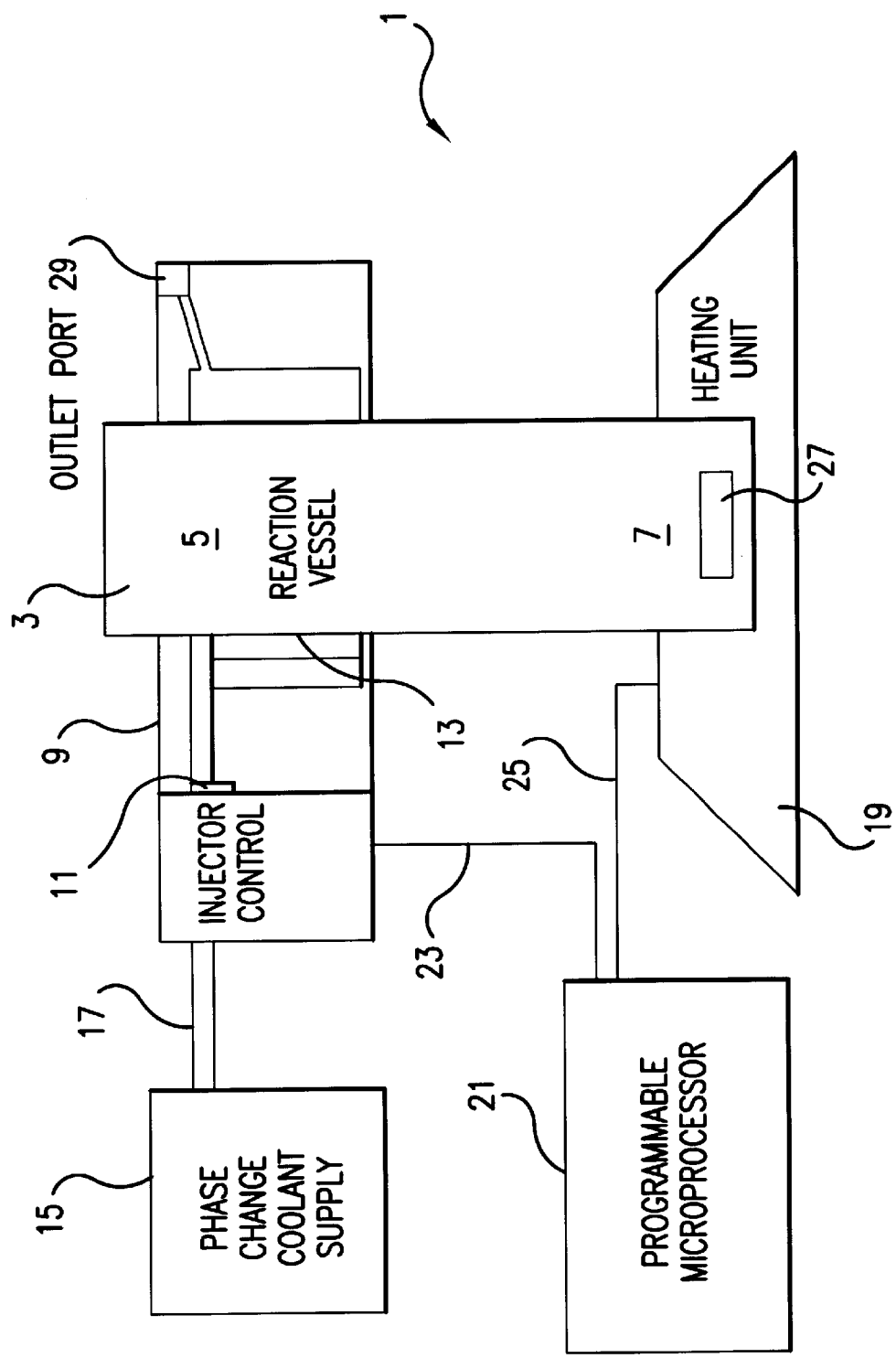
FIG. 4 is a schematic diagram of the present invention reaction vessel system, and two representative embodiments of the reaction vessel system are shown in FIGS. 5 and 6.

A schematic diagram of the heatable, coolable reaction vessel system 1 is shown in FIG. 4. The reaction vessel 3 has a cooling section 5 and a heating section 7. Inlet port 9 provides coolant from injector control 11 to cooling unit 13. Cooling unit 13 physically surrounds and connects to cooling section 5 of the reaction vessel 3 to transfer heat from section 5 to the coolant in the cooling unit 13. Outlet port 29 ejects spent coolant from cooling unit 13 to the atmosphere. A supply of phase change coolant 15 is connected to coolant injector 11 via conduit 17, and thereby into coolant unit 13.

Heating unit 19 is shown at the heating area 7 of reaction vessel 3. The heating unit physically surrounds and connects to heating area 7 of reaction vessel 3 to transfer heat into the vessel as needed to control the chemical reactions occurring in reaction vessel 3.

Programmable microprocessor 21 is the control means for the reaction vessel system, and is connected to the coolant injector control 11 via cable 23 and to heating unit 19 via cable 25 to implement the required temperature-time cycling desired within the reaction vessel, and programmed into the microprocessor 21 for execution.

A magnetically operated stirring device 27 is shown within the reaction vessel in heating area 7.

Figure 5:
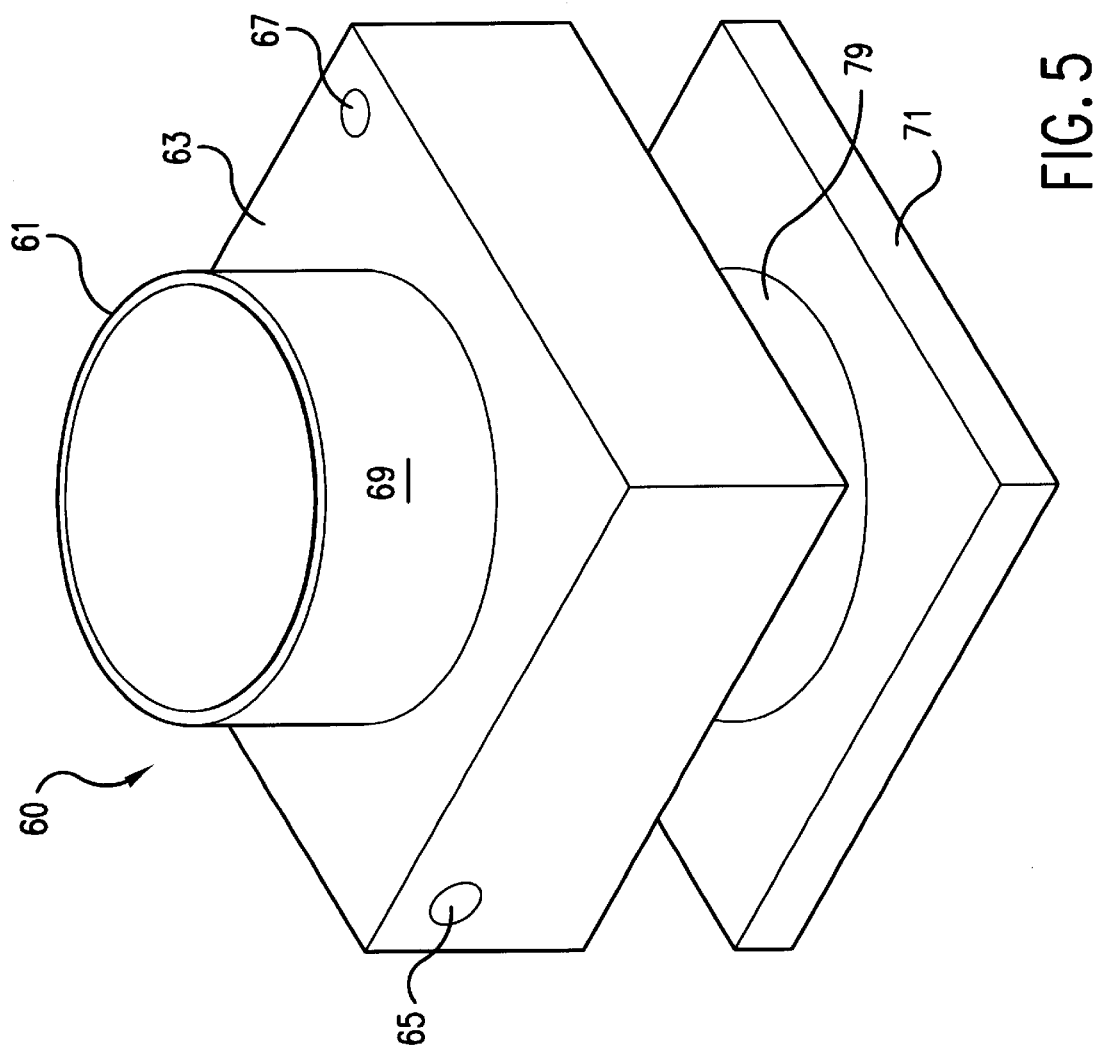

FIG. 5 is a perspective view of one embodiment of the reaction vessel system 60. Reaction vessel 61 has cooling section 69 and heating section 79. Surrounding cooling section 69 of the reaction vessel 61 is cooling unit 63 with phase change coolant inlet port 65 and phase change coolant outlet port 67. Heating unit 71 is shown surrounding heating section 79 of reaction vessel 61.

Figure 6:
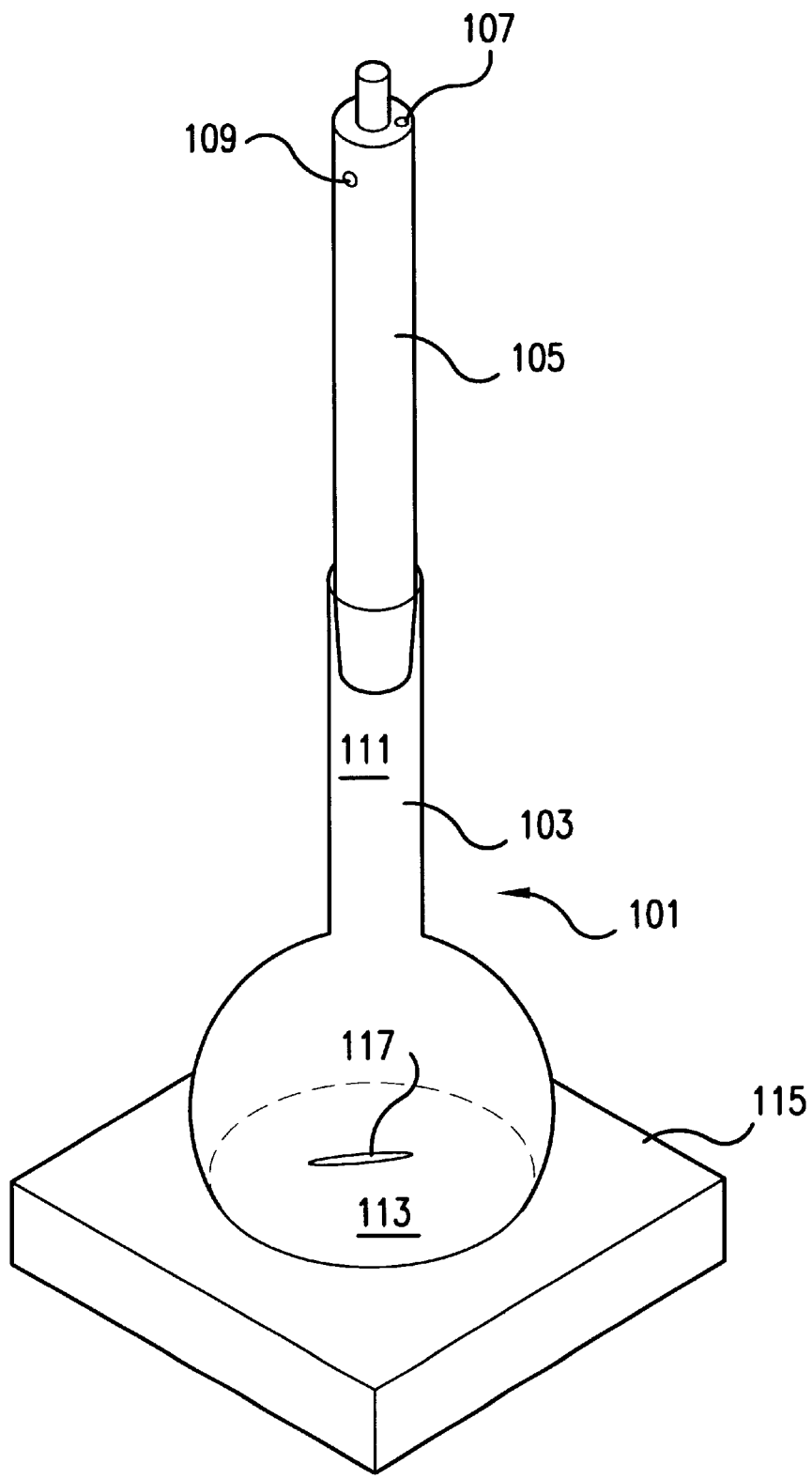

FIG. 6 shows a perspective view of a second embodiment of the reaction vessel system 101. Reaction vessel 103 has an upper section 111 with a cooling unit 105 having phase change coolant inlet port 107 and phase change coolant outlet port 109. Also shown is heating section 113 of reaction vessel 101 surrounded by heating unit 115. Magnetically operated stirring device 117 is shown inside reaction vessel 103.

The magnetic stirring device 117 is provided in a preferred embodiment of the reaction vessel system to asset in promoting the chemical reactions occurring in the reaction vessel which are being controlled by the cooling and heating subsystems. The magnetic stirring device is actuated by a magnetic drive mechanism located within the heating unit 115 at the heating area 113 of reaction vessel 103. The required operating cycle of the stirring device during a particular reaction time sequence is controlled by the programmable controller 21 in FIG. 4.

The foregoing describes preferred embodiments of the present invention, and FIGS. 4, 5 and 6 illustrate upper reaction vessel cooling units and lower reaction vessel heating units. These may be reversed, or multiple heating and/or cooling units may be included in any useful arrangement without exceeding the scope of the present invention. Likewise, any sequence of heating/cooling or cooling/heating or repeats, reverses or even simultaneous heating and cooling may be effected by the present invention.

Also, as mentioned above, the heating and cooling units of the present invention may be directly or indirectly connected thermally to the reaction vessel. Indirect connection may include, for example, baths, such as oil baths, water baths or gel baths; others may be other heat exchange media, such as flowing gases or solids or combinations.

Obviously, numerous modifications and variations of the present invention are possible in light of the above teachings. It is therefore understood that within the scope of the appended claims, the invention may be practiced otherwise than as specifically described herein.

What is claimed is:

1. A reaction vessel system, which comprises:
   (a.) at least one reaction vessel having an upper portion and a lower portion;
   (b.) at least one cooling unit functionally connected to said at least one vessel at one of said upper portion and said lower portion, to impart controlled cooling thereto, said cooling unit including:
      (i.) a cooling element in proximity to said vessel and having an inlet port for injection of a liquid phase change coolant, a heat absorbent area, and an outlet port for removal of said phase change coolant in a gaseous state; and,
      (ii.) injection means for injection of a phase change coolant in liquid form into said inlet port of said cooling element for creation of cooling by phase change from a liquid state to a gaseous state and;
   (c.) at least one heating unit functionally connected to said at least one vessel at the other of said upper portion and said lower portion relative to said at least one cooling unit, to impart controlled heating thereto; and,
   (d.) control means connected to said at least one cooling unit and said at least one heating unit for programmable automatic control of said injection means to control at least one of on/off flow and rate of flow, and to control at least one of on/off heating and rate of heating, said control means including a programmable device.

2. The system of claim 1 wherein said control means includes software, and said system includes an injection means physical control device, for cyclical on/off control thereof to maintain a predetermined cooling temperature level.

3. The system of claim 2 wherein said control means includes software, and said system includes an injection means physical control device, for cyclical on/off control thereof to establish at least one predetermined temperature sequence involving a plurality of diverse, programmable temperature levels, with means to vary on/off time sequences.

4. The system of claim 1 which further includes a remote reservoir of a phase change coolant connected to said injection means and inlet port, wherein said reservoir contains a phase change coolant in a liquid state under pressure.

5. The system of claim 1 which further includes phase change coolant generation means connected thereto.

6. The system of claim 4 wherein said phase change coolant is an environmentally inert material which absorbs heat upon vaporization and has a boiling point below room temperature at atmospheric pressure.

7. The system of claim 6 wherein said phase change coolant is selected from the group consisting of inert gases, carbon dioxide and nitrogen.

8. The reaction vessel system of claim 1, adapted for use in reacting chemicals, wherein:
   (a.) a reaction vessel having an upper portion and a lower portion;
   (b.) said at least one cooling unit is connected to said vessel and its upper portion; and there is a phase change coolant source connected to said injection means and containing a phase change coolant in a liquid state under pressure; and,
   (c.) said at least one heating unit is connected to said vessel at its lower portion and adapted to programmable and controlled impart heat to said vessel.

9. The reaction vessel system of claim 8 wherein said outlet port is an exhaust port for removal of said phase change coolant from said cooling unit by gaseous exhaustion.

10. The reaction vessel system of claim 8 wherein said control means includes preprogrammable capability for presetting a plurality of desired temperature settings and desired times corresponding to said desired temperature settings, at least one temperature sensor functionally connected to said vessel, and sufficient software to recognize temperature from said vessel and to respond thereto by controlling the operation of said heating unit and said cooling unit to achieve said desired temperature settings and desired times within predetermined acceptable ranges of deviation.

11. The reaction vessel system of claim 10 wherein said control means includes software, and said system includes an injection means physical control device, for cyclical on/off control thereof to maintain a predetermined cooling temperature level.

12. The reaction vessel system of claim 10 wherein said control means includes software, and said system includes an injection means physical control device, for cyclical on/off control thereof to establish a predetermined temperature sequence involving a plurality of diverse, programmable temperature levels.

13. The reaction vessel system of claim 8 wherein said phase change coolant is an environmentally inert material which absorbs heat upon vaporization and has a boiling point below room temperature at atmospheric pressure.

14. The reaction vessel system of claim 13 wherein said phase change coolant is selected from the group consisting of inert gases, carbon dioxide and nitrogen.

* * * * *